United States Patent
Lee et al.

(10) Patent No.: US 6,539,060 B1
(45) Date of Patent: Mar. 25, 2003

(54) IMAGE DATA POST-PROCESSING METHOD FOR REDUCING QUANTIZATION EFFECT, APPARATUS THEREFOR

(75) Inventors: Yung-lyul Lee, Seoul (KR); Hyun-Wook Park, Seoul (KR)

(73) Assignees: Samsung Electronics Co., Ltd., Kyungki-Do (KR); Korea Advanced Institute of Science and Technology, Taejun (KR)

( * ) Notice: Subject to any disclaimer, the term of this patent is extended or adjusted under 35 U.S.C. 154(b) by 0 days.

(21) Appl. No.: 09/530,105

(22) PCT Filed: Oct. 9, 1998

(86) PCT No.: PCT/KR98/00311

§ 371 (c)(1),
(2), (4) Date: Jun. 30, 2000

(87) PCT Pub. No.: WO99/22509

PCT Pub. Date: May 6, 1999

(30) Foreign Application Priority Data

Oct. 25, 1997 (KR) ............................................. 97/55067

(51) Int. Cl.[7] ................................................ H04N 7/12
(52) U.S. Cl. ................................................ 375/240.29
(58) Field of Search ....................... 375/240.25, 240.24, 375/240.27, 240.29, 240.2, 240.13, 240.16, 240.28, 240.03; 348/402.1, 407.1, 413.1, 416.1, 420.1, 425.1, 425.2; 382/233, 236, 243, 248, 250, 251, 252

(56) References Cited

U.S. PATENT DOCUMENTS

| | | | |
|---|---|---|---|
| 5,193,002 A | 3/1993 | Guichard et al. ...... 375/240.12 |
| 5,253,075 A | 10/1993 | Sugiyama ................ 358/261.2 |
| 5,335,990 A | * 8/1994 | Maxon, III .................... 366/42 |
| 5,379,122 A | 1/1995 | Eschbach .................... 358/426 |
| 5,563,718 A | 10/1996 | Wober et al. ............. 375/240.2 |
| 5,850,294 A | * 12/1998 | Apostolopoulos et al. .. 358/433 |
| 5,883,983 A | * 3/1999 | Lee et al. ..................... 382/268 |
| 5,986,707 A | * 11/1999 | Geshwind ................... 340/588 |
| 6,115,503 A | * 9/2000 | Kaup .......................... 382/268 |

FOREIGN PATENT DOCUMENTS

| | | | | |
|---|---|---|---|---|
| EP | 0723375 A2 | * 7/1996 | ............ H04N/7/30 |
| EP | 0781053 A2 | * 6/1997 | ............ H04N/7/30 |
| WO | 96/42165 | * 12/1996 | ............ H04N/7/12 |
| WO | 97/29594 | * 8/1997 | ............ H04N/7/30 |
| WO | 97/34422 | * 9/1997 | ............ H04N/7/30 |

OTHER PUBLICATIONS

Gopinath et al., "Wavelet–based post–processing of low bit rate transform coded images", IEEE ICIP–94, vol. 2, pp. 913–917.*

Kurz et al., "An adaptive algorithm for boundary element method postprocessing", IEEE Trans. on Magnetics, vol. 32, Iss. 3, Part: 1, May 1996, pp. 1465–1468.*

(List continued on next page.)

Primary Examiner—Vu Le
(74) Attorney, Agent, or Firm—Sughrue Mion, PLLC

(57) ABSTRACT

An image data post-processing method for reducing quantization effect induced when image data compressed based on a block is decoded, and an apparatus therefor. The image data post-processing method includes the steps of: (a) detecting semaphore representing whether or not post-processing is required, using distribution of inverse quantization coefficients of inverse-quantized image data and a motion vector representing the difference between the blocks of a previous video object plane (VOP) and blocks of a current VOP; and (b) filtering the decoded image data corresponding to the semaphore by a predetermined method, if it is determined by checking the detected semaphore that post-processing is required. Therefore, the quantization effect can be reduced by using the semaphore and an adaptive filter, and the amount of computation for filtering is also reduced. Also, the complexity of the hardware is reduced by a parallel process without multiplication and division.

31 Claims, 7 Drawing Sheets

OTHER PUBLICATIONS

Yongyi Yang et al., "Projection–based spatially adaptive reconstruction of block–transform compressed images", IEEE Trans. on Image Processing, vol. 4, iss. 7, Jul. 1997, pp. 896–908.*

Lang et al., "Noise reduction using an undecimaged discrete wavelet transform", IEEE Signal Processing Letters, vol. 3, iss. 1, Jan. 1996, pp. 10–12.*

Zixiang Xiong et al., "A deblocking algorithm for JPEG compressed images using overcomplete wavelet representations", IEEE Trans. on Cir. and Syst. for Video Tech., vol. 7, iss. 2, Apr. 1997, pp. 433–437.*

International Search Report.

* cited by examiner

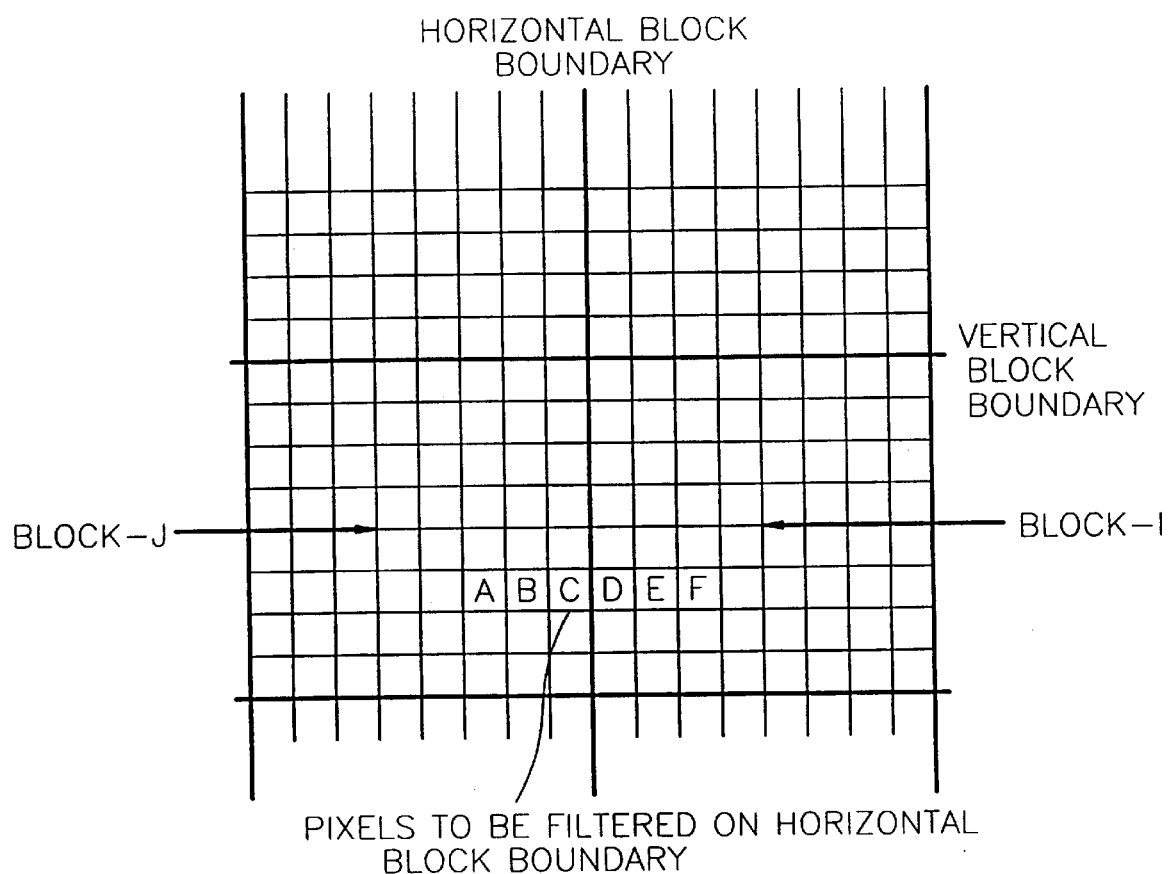

FIG. 7A
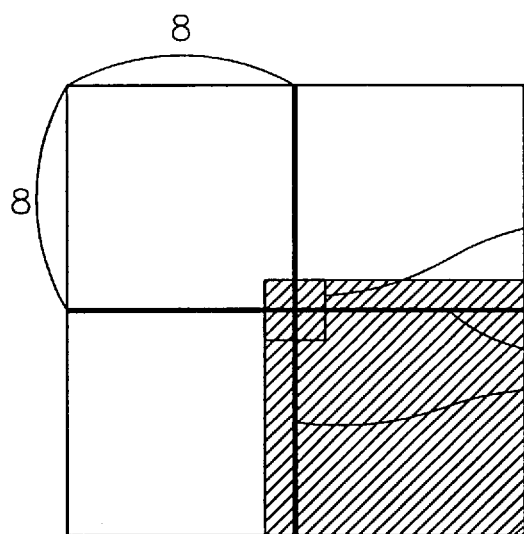
FIG. 7B
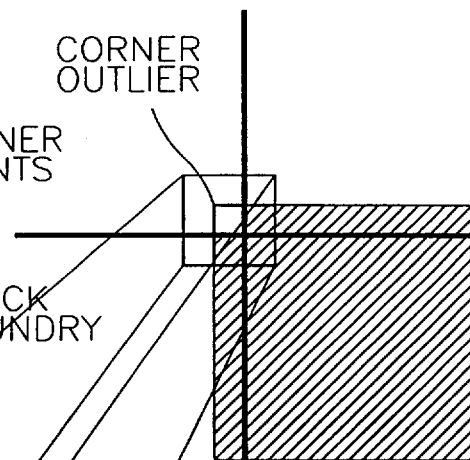
FIG. 7C
| $A_3$ | $A_2$ | $B_2$ | $B_3$ |
|---|---|---|---|
| $A_1$ | A | B | $B_1$ |
| $C_1$ | C | D | $D_1$ |
| $C_3$ | $C_2$ | $D_2$ | $D_3$ |

IMAGE DATA POST-PROCESSING METHOD FOR REDUCING QUANTIZATION EFFECT, APPARATUS THEREFOR

TECHNICAL FIELD

The present invention relates to image data processing, and more particularly, to an image data post-processing method for reducing quantization effect, and an apparatus therefor.

BACKGROUND ART

The present invention is adopted as ISO/IEC JTC1/SC29/WG11 N1902 (ISO/IEC 14496-2 Committee Draft).

Generally, picture encoding standards such as MPEG of the International Standardization Organization (ISO) and H.263 recommended by the International Telecommunication Union (ITU) adopt block-based motion estimation and discrete cosine transform (DCT) of blocks. Also, most video coding standards use an 8×8 pixel block DCT for packing information into a few transform coefficients. Such block-based DCT schemes take advantage of the local spatial correlation property of images.

However, when image data which has been coded based on blocks is restored, the restored image is considerably deteriorated, causing blocking artifacts near block boundaries, corner outliers at cross points of blocks, and ringing noise near the image edge. Because MPEG quantizes the transformed coefficient of 8×8 pixel block. In particular, when the image is highly compressed, the deterioration of the image becomes serious.

When an image is highly compressed, the block-based coding induces the well-known blocking artifacts near the block boundary, corner outliers at the cross points of the blocks, and ringing noise near the image edge.

The blocking artifacts are grid noise occurring along the block boundaries in a relatively homogeneous area. The grid noise shows traces of the block-based process at the edges between blocks when the compressed data is displayed on a screen after being restored. Thus, the edges between blocks are identified. Also, corner outliers occur at the corner points of the 8×8 block. Also, the ringing noise is a typical Gibb's phenomenon occurring by truncation when high-frequency coefficients of the DCT are quantized so as to highly compress the image. As a result, overlapping of image with a predetermined interval due to the ringing noise is noticeable.

Several methods for reducing the blocking artifacts, corner outliers and ringing noise, caused by block-based coding, have been suggested in the following articles: [1] Lee, H. C. Kim and H. W. Park, "Blocking Effect Reduction of JPEG images by Signal Adaptive Filtering", in press IEEE Trans. on Image processing, 1997, [2] B. Ramanurthi and A. Gersho, "Nonlinear Space Variant Postprocessing of Block Coded Images", IEEE Trans. on ASSP, Vol. 34, No. 5, pp. 1258–1267, 1986, [3] Y. Ynag, N. Galatsanos and A. Katsaggelos, "Projection-Based Spatially Adaptive Reconstruction of Block-Transform Compressed Images", IEEE Trans. on Image processing, Vol. 4, No. 7, pp. 896–908, Jul. 1995, [4] Z. Xiong, M. T. Orchard, and Y. Q. Zhang, "A Deblocking Algorithum for JPEG Compressed Images Using Overcomplete Wavelet Representations", IEEE Trans. Circuits Syst. Video Technol., Vol. 7, No. 2, pp. 433–437, 1997.

In the reference [1], 2-dimensional signal-adaptive filtering (SAF) for reducing quantization effect of a JPEG-decompressed image has been suggested. Also, in the reference [2], a 2-dimensional filter is used to reduce the blocking artifacts and a 1-imensional filter is used to reduce staircase noise, resulting in good effects. In the reference [3], an iterative image-recovery algorithm using the theory of projections onto convex sets (POCS) has also been proposed.

However, the main drawback of these algorithms is their computation complexity. Meanwhile, post-filtering which uses over-complete wavelet representation which reduces the complexity of computation has been suggested by the reference [4].

However, the post-filtering method is applied only to JPEG-decompressed images. Also, for low bit-rate coding, a spatio-temporal adaptive post-filtering which can be applied to a 3-dimensional subband coding has been suggested in the reference [5]: T. S. Liu and N. Jayant, "Adaptive Postprocessing Algorithms for Low Bit Rate Video Signals", IEEE Trans. on Image Processing, Vol. 4, No. 7, pp. 1032–1035, Jul. 1995. However, this method also has computation complexity.

DISCLOSURE OF THE INVENTION

To solve the above problems, it is an objective of the present invention to provide an image data post-processing method for reducing quantization effects such as blocking artifacts, corner outliers and ringing noise, from an MPEG-decompressed image, which can perform low bit rate coding without complex computation, and an apparatus therefor.

According to an aspect of the present invention, there is provided an image data post-processing method for reducing quantization effect induced when image data compressed based on a block is decoded, the method comprising the steps of: (a) detecting semaphore representing whether or not post-processing is required, using distribution of inverse quantization coefficients of inverse-quantized image data and a motion vector representing the difference between the blocks of a previous video object plane (VOP) and blocks of a current VOP; and (b) filtering the decoded image data corresponding to the semaphore by a predetermined method, if it is determined by checking the detected semaphore that post-processing is required.

Preferably, the step (a) is performed on an intra-VOP in an intra-VOP mode, and on in inter-VOP in an inter-VOP mode.

Preferably, the semaphore includes a blocking semaphore representing whether or not reduction of blocking artifacts near block boundaries is required, and a ringing semaphore representing whether or not reduction of ringing noise near image edges is required.

Preferably, the blocking semaphore and the ringing semaphore of the intra-VOP are detected by investigating distribution of inverse quantization coefficients which are discrete cosine transform (DCT) coefficients after the compressed bitstream is inverse quantized.

Preferably, the blocking semaphore of the intra-VOP comprises a horizontal blocking semaphore (HBS) and a vertical blocking semaphore (VBS), assuming that the uppermost and leftmost pixel of the block, among 64 pixels constituting the 8×8 block, is pixel A, the pixel to the right of the pixel A is a pixel B, and the pixel below the pixel A is a pixel C, and the HBS and the VBS of the intra-VOP are extracted by the steps of: (a) calculating discrete cosine transform (DCT) coefficients on the inverse-quantized 8×8 block after the compressed image data is inversely quantized; (b) setting the HBS and the VBS to "1" which means that post-processing is required, if only the coefficient of the pixel A is non-zero; (c) setting the VBS to "1" which means that post-processing is required, if only the top row of the inverse-quantized 8×8 block includes non-zero coefficient pixel; and (d) setting the HBS to "1" which means that the post-process is required, if on the leftmost column of the inverse-quantized 8×8 block includes non-zero coefficient pixel.

Preferably, assuming that the uppermost and leftmost pixel of the block, among 64 pixels constituting the 8×8 block, is pixel A, the pixel to the right of the pixel A is a pixel B, and the pixel below the pixel A is a pixel C, the ringing semaphore (RS) of the intra-VOP is set to "1" which means post-processing is required, if any pixel other than the pixels A, B and C of the inverse-quantized 8×8 block has a non-zero coefficient.

Preferably, the blocking semaphore of the current inter-VOP comprises a horizontal blocking semaphore (HBS) and a vertical blocking semaphore (VBS), and assuming that a reference VOP comprises predetermined reference blocks, and the block of the reference VOP predicted by a motion vector (MVx,MVy) of a block Ac of the current inter-VOP is a motion block X, the HBS and the VBS of on the block Ac of the current inter-VOP are extracted by the steps of: checking the degree of overlapping between the motion block X and the reference blocks; performing a bit-wise AND operation on the HBS and VBS of the reference blocks in which the number of the overlapped pixels is more than a predetermined number; and setting the HBS and the VBS of the block Ac of the current VOP to the result of the operation.

Preferably, assuming that a reference VOP comprises predetermined reference blocks, and the block of the reference VOP predicted by a motion vector (MVx,MVy) of a block Ac of the current inter-VOP is a motion block X, the ringing semaphore (RS) of the block Ac of the current inter-VOP is extracted by the steps of: setting the RS of the current block Ac to "1" if an inverse quantized coefficient (IQC) of a residual signal in the 8×8 block of the inter-VOP is non-zero; setting the RS of the block to "1" in an 8×8 prediction mode which is supported by the MPEG4 algorithm and transfers four motion vectors on one macroblock (MB); and checking the degree of overlapping between the motion block X and the reference blocks, if the RS is still zero, and performing a bit-wise OR operation on the RS of the reference blocks in which the number of the overlapped pixels is more than a predetermined number, to set the RS of the block Ac of the current VOP to the result of the operation.

Preferably, filtering is performed by the steps of: (a) changing a predetermined number of pixel values of a horizontal block boundary between a block I and a block J adjacent to the block I if the HBSs of the blocks I and J are set to "1"; (b) comparing the difference between the values of two pixels adjacent to each other around the horizontal block boundary with a quantization factor (QP) of the H.263 if the HBS of either the block I or the block J is zero, and changing the values of the pixels whose number is less than in the step (a) if the difference of the pixels is less than the QP, wherein the filtering on the pixels around the vertical block boundary is performed using the VBS in the same manner as in the pixels around the horizontal block boundary.

Preferably, assuming six pixels around the horizontal block boundary between the blocks I and J are pixels A, B, C, D, E and F, the pixels C and D are nearest to the horizontal block boundary, the pixels A and F are farthest to the horizontal block boundary, and the pixels B and E are located at the middle of the pixels A and C, and pixels D and F, low-pass filtering on the 6 pixels is performed using a 7-tab (1,1,1,2,1,1,1) low pass filter in the step (a), and the filtering of the step (b) is performed on the pixels B, C, D and E, wherein assuming that the difference between the pixels C and D is d, the pixels C and D are filtered as an average of the pixels C and D, and the filtered pixels B and E are different from the pixels B and E, respectively, by d/8.

Preferably, the filtering step comprises the steps of: detecting horizontal and vertical edges of image data; and performing 2-dimensional adaptive signal filtering on an 8×8 block requiring reduction of ringing noise, wherein assuming that a pixel within a block having a predetermined size is pixel[m][n], the pixel to the right of the pixel[m][n] is pixel[m][n+1], the pixel to the left of the pixel[m][n] is pixel[m][n−1], the difference between the pixel[m][n] and the pixel[m][n+1] is A1, and the difference between the pixel[m][n] and the pixel[m][n+1] is A2, and the quantization factor of the H.263 is QP, the horizontal edge detection is performed by a logical formula ((A1>QP) and (A2>QP)) or (A1>2QP) or (A2>2QP) wherein the pixel[m][n] is determined as edge and edge map Edge[m][n] is set to "1" if the logical formula is satisfied, and assuming that the pixel above the pixel[m][n] is pixel[m−1][n], the pixel below the pixel[m][n] is pixel[m−1][n], the difference between the pixel[m][n] and the pixel[m+1][n] is A'1, the difference between the pixel[m][n] and the pixel[m−1][n] is A'2, and the quantization factor of the H.263 is QP, the vertical edge detection is performed by a logical formula ((A'1>QP) and (A'2>QP)) or (A'1>2QP) or (A'2>2QP) wherein the pixel [m][n] is determined as edge and edge map Edge[m][n] is set to "1" if the logical formula is satisfied, and signal adaptive filtering is performed by applying a 4-connected filter window to the 8×8 block, wherein filtering is not performed if the central pixel of the filter window is an edge, and weighted filtering is performed if the central pixel of the filter window is a non-edge pixel.

Also, there is provided an image data post-processing method for reducing corner outliers occurring at the corner of a cross point where four blocks meet when image data compressed based on a block are decoded, the method comprising the steps of: (a) detecting corner outliers from the block of inverse-quantized image data; and (b) compensating for the detected corner outliers. Assuming that four pixels around the cross point are pixels A, B, C and D, value[0] is A, value[1] is B, value[2] is C, value[3] is D, (A+B+C+D+2)/4 is Average, $A_1$ and $A_2$ are pixels adjacent to the pixel A in the block to which the pixel A belongs, $A_3$ is a pixel diagonal to the pixel A, $B_1$ and $B_2$ are pixels adjacent to the pixel B in the block to which the pixel B belongs, $B_3$ is a pixel diagonal to the pixel B, C, and $C_2$ are pixels adjacent to the pixel C in the block to which the pixel C belongs, $C_3$ is a pixel diagonal to the pixel C, $D_1$ and $D_2$ are pixels adjacent to the pixel D in the block to which the pixel D belongs, and $D_3$ is a pixel diagonal to the pixel D, the step (a) may comprise the sub-steps of: (a1) comparing the difference between the value[0] and the Average with the quantization factor (QP) of the H.263, and counting the pixel A as the corner outlier candidate pixel if the difference is greater than the QP; (a2) performing the step (a1) on the value[1], value[2] and value[3] to count the corresponding pixel as a corner outlier candidate pixel; and (a3) detecting the pixel as a corner outlier pixel if the corner outlier candidate pixel is only one, and detecting the candidate pixel having the greatest difference from $(A_3+B_3+C_3+D_3+2)/4$ as a corner outlier pixel if there are two or more corner outlier candidate pixels. Also, the step (b) may be performed by compensating for the pixel A as A' by (4A+B+C+2D+4)/8, the pixel $A_1$ as $A_1$' by (A'+3$A_1$+2)/4, the pixel $A_2$ as $A_2$' by (A'+3$A_2$+2)/4, if the corner outlier pixel is A and the difference between the pixels A and $A_3$ is less than 3QP/2; compensating for the pixel B as B' by (4B+C+D+2A+4)/8, the pixel $B_1$ as $B_1$' by (B'+3$B_1$+2)/4, the pixel $B_2$ as $B_2$' by (B'+B$A_2$+2)/4, if the corner outlier pixel is B and the difference between the pixels B and $B_3$ is less than 3QP/2; compensating for the pixel C as C' by (4C+D+A+2B+4)/8, the pixel $C_1$ as $C_1$' by (C'+3$C_1$+2)/4, the pixel $C_2$ a $C_2$' by (C'+3$C_2$+2)/4, if the corner outlier pixel is C and the difference between the pixels C and $C_3$ is less than 3QP/2; and compensating for the pixel D as D' by (4D+A+B+2C+4)/8, the pixel $D_1$ as $D_1$' by (D'+3$D_1$+2)/4, the pixel $D_1$ as $D_2$' by (D'+3$D_2$+2)/4, if the corner outlier pixel is D and the difference between the pixels D and $D_3$ is less than 3QP/2.

Also, there is provided an image data post-processing method for reducing quantization effect induced when image data compressed based on a block is decoded, the method comprising the steps of: (a) detecting semaphore representing whether or not post-processing is required, using distribution of inverse quantization coefficients of inverse-quantized image data and a motion vector representing the difference between blocks of previous video object plane (VOP) and blocks of a current VOP; (b) detecting a corner outlier pixel of the inverse-quantized image data block, by the above steps used in the above image data post-processing method for reducing the corner outliers; (c) filtering the decoded image data corresponding to the semaphore by a predetermined method, if it is determined by checking the detected semaphore that the post-process is required; and (d) compensating for the detected corner outlier through the steps used in the above image data post-processing method for reducing the corner outliers.

According to another aspect of the present invention, there is provided an image data post-processing apparatus for reducing quantization effect induced when image data compressed based on a block is decoded, the apparatus comprising: a semaphore detector for detecting a semaphore representing whether or not post-processing is required, using distribution of inverse quantization coefficients of inverse-quantized image data and a motion vector representing the difference between blocks of previous video object plane (VOP) and blocks of a current VOP; a deblocking filter for checking blocking semaphore detected by the semaphore detector and performing deblocking filtering on the decoded image data; a corner outlier compensator for detecting a corner outlier from the data passed through the deblocking filtering and compensating for the detected corner outlier; and a deringing filter for checking ringing semaphore detected by the semaphore detector and performing deringing filtering on the corner outlier compensated data.

Also, the present invention may be embodied as a program capable of being run by a computer, and may be embodied in a general purpose digital computer that is running the program from a computer usable medium including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet).

According to still another aspect of the present invention, there is provided a computer readable medium having embodied thereon a computer program for image data post-processing for reducing quantization effect induced when image data compressed based on a block is decoded, wherein the image data post-processing comprises the steps of: (a) detecting semaphore representing whether or not post-processing is required, using distribution of inverse quantization coefficients of inverse-quantized image data and a motion vector representing the difference between the blocks of a previous video object plane (VOP) and blocks of a current VOP; and (b) filtering the decoded image data corresponding to the semaphore by a predetermined method, if it is determined by checking the detected semaphore that post-processing is required.

BRIEF DESCRIPTION OF THE DRAWINGS

FIG. 5 shows a block boundary and a pixel position of the block boundary, for illustrating the operation of a deblocking filter for reducing blocking artifacts;

FIG. 7A shows an example of image edge in which the corner outlier is due to the quantization, FIG. 7(B) shows the corner outlier occurred by the quantization, and FIG. 7(C) shows coordination values at the corner points for compensating for the corner outlier;

BEST MODE FOR CARRYING OUT THE INVENTION

Figure 1:
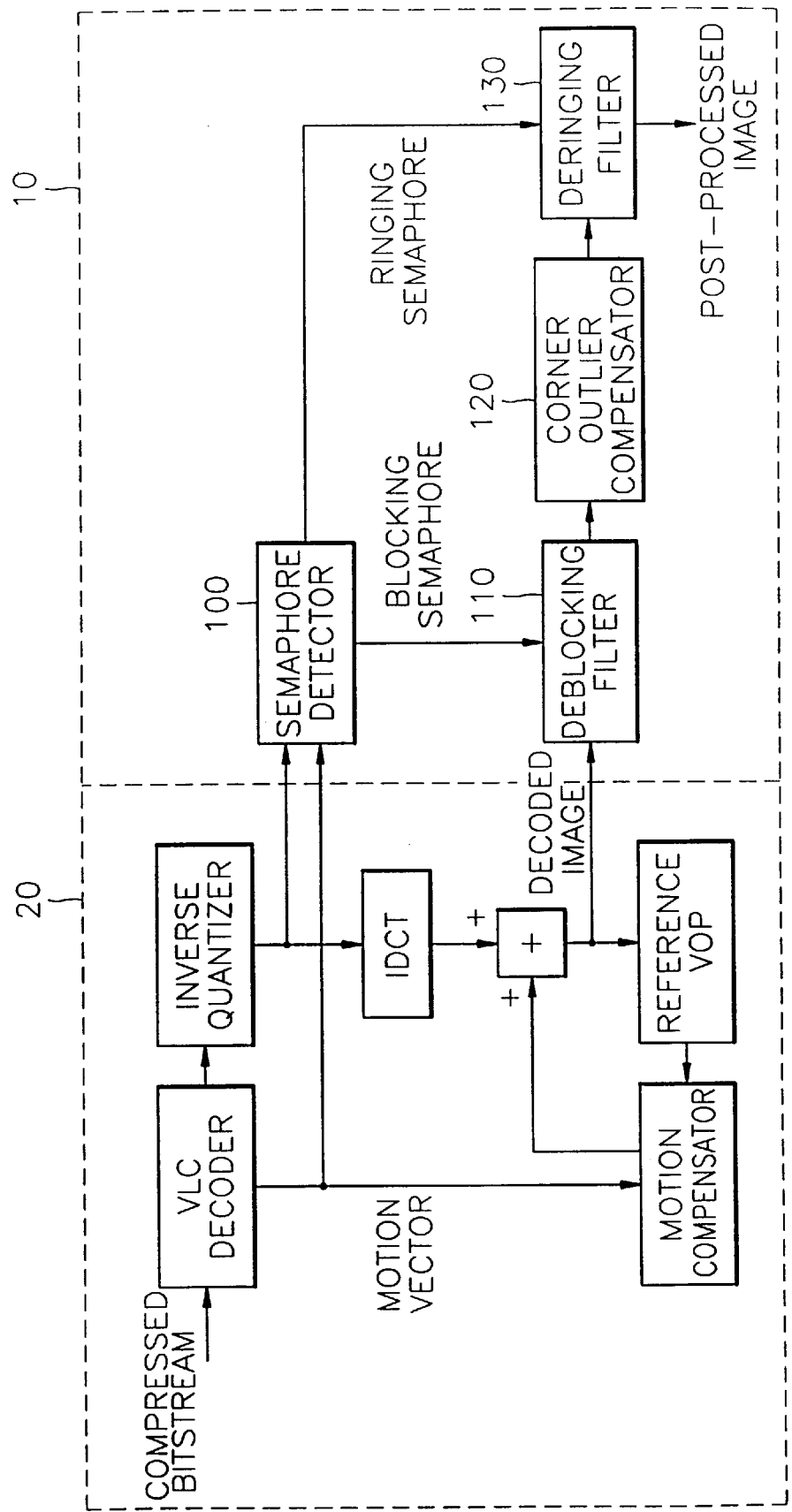
FIG. 1 is a block diagram of a decoder for decoding a block-based coded image data, and an image data post-processing apparatus for reducing quantization effect occurring when an image is decoded by the decoder.

In FIG. 1, a decoder 20, which is a general decoder, decodes block-based image data and an image data post-processing apparatus 10 for reducing quantization effect occurring when the decoder 20 decodes an image, includes a semaphore extractor 100, a deblocking filter 110, a corner outlier compensator 120 and a deringing filter 130.

The semaphore extractor 100 extracts a semaphore using the distribution of inverse quantization coefficients (IQCs) of an image data that has been inverse-quantized, and a motion vector representing the difference between the previous video object plane (VOP) and the current VOP.

The semaphore is information representing whether or not the decoded image requires post-processing, and is divided into a blocking semaphore and a ringing semaphore. The blocking semaphore represents whether or not there is need for reducing blocking artifacts near the blocking boundary, and the ringing semaphore represents whether or not there is need for reducing the ringing noise near the image edge. Also, the blocking semaphore is constituted by a horizontal blocking semaphore (HBS) representing whether or not post-processing on pixels of adjacent block of a horizontal block boundary line is required, and a vertical blocking semaphore (VBS)representing whether or not post-processing on the pixels of adjacent block of a vertical block boundary line is required.

Also, the semaphore extraction is performed on an intra-VOP and an inter-VOP. The semaphore extraction on the intra-VOP is performed using distribution of IQCs of the inverse-quantized image data. The semaphore extraction on the inter-VOP is based on a motion vector representing the difference between the previous VOP and the current VOP.

The deblocking filter 110 checks the blocking semaphore extracted from the semaphore extractor 100 using an one-dimensional horizontal and vertical low pass filter (LPF), and performs deblocking filtering on the decoded image data.

The outlier compensator 120 detects a corner outlier of the data passed through the deblocking filter 110, and compensates for the detected corner outlier.

The deringing filter 130 checks the ringing semaphore extracted by the semaphore extractor 100 using a 2-dimensional signal adaptive filter (2-D SAF), and performs deringing filtering on the corner outlier compensated data.

Meanwhile, the operation of the present invention will be described in detail in the following embodiments. According to the basic concept of the image data post-processing method of the present invention, quantization effect is adaptively reduced by using spatial frequency and temporal information.

Also, in the present invention, subjective image quality, peak signal to noise ratio (PSNR) and complexity of computation are considered. Particularly, the computation complexity is a very important factor in the MPEG-4 when the basic concept is implemented by software and hardware. In order to extract the semaphores of the blocking artifacts and ringing noise in every 8×8 block, distribution of the quantization coefficients in a frequency domain and a motion vector is investigated. A blocking semaphore and a ringing semaphore are used, so that a 1-dimensional low pass filter (1-D LPF) and a 2-D SAF are adaptively used in every 8×8 block.

First, the semaphore extraction from the blocking artifacts and ringing noise by the semaphore extractor 100 will be explained.

1. The Semaphore for Blocking Artifacts and Ringing Noise

In order to reduce the number of computations and to perform an efficient reduction of the quantization effects in the MPEG4, two kinds of semaphores are defined: the blocking semaphore and the ringing semaphore. The blocking and the ringing semaphores are extracted from the DCT domain of each 8×8 block in the intra-video object plane (VOP). Also, the semaphores of the inner-VOP are calculated from both the residual signal and the semaphores of the reference VOP.

1.1 Semaphore Extraction for intra-VOP

Figure 2:
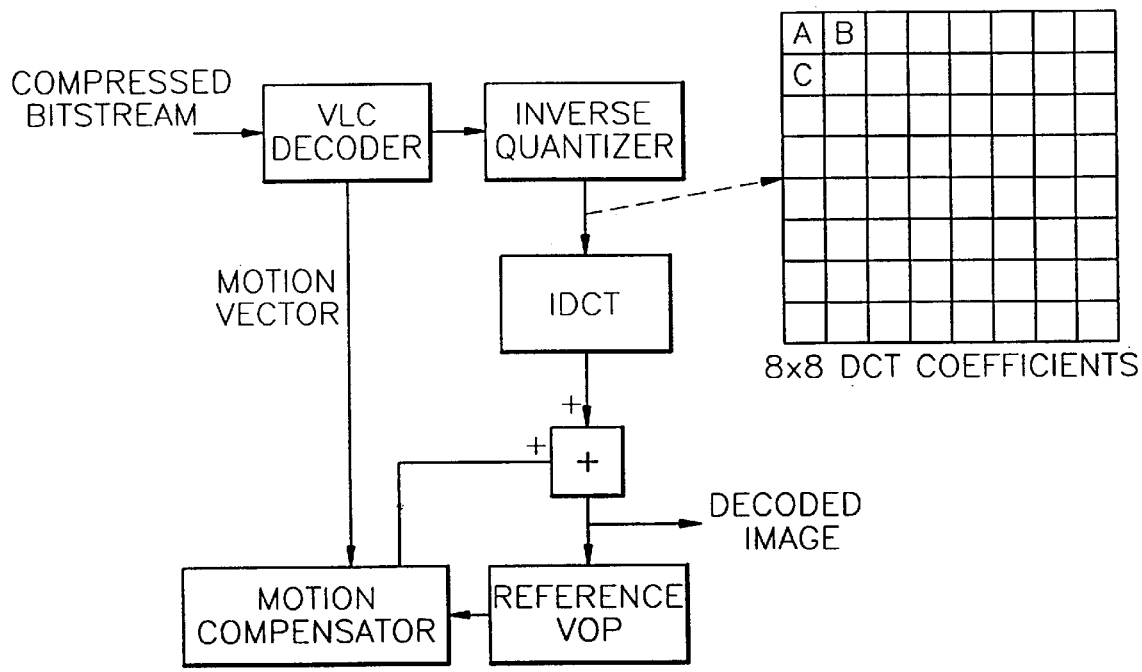
FIG. 2 shows a block diagram of an MPEG4 decoder and an 8×8 DCT coefficient block which is inversely quantized by an inverse quantizer of the decoder.

The distribution of the inverse quantized coefficient (IQC), the DCT coefficients after inverse quantization, is investigated. FIG. 2 shows the decoder block diagram of the MPEG4. In the 8×8 inverse quantized block of FIG. 2, the coefficients A, B and C are used for deciding the blocking and the ringing semaphores.

When only the coefficient in position A of FIG. 2 has a non-zero value, the 64 pixels of the 8×8 decoded block have the same value in the spatial domain; therefore, a block having only a DC component can induce horizontal and vertical block artifacts. In this case, both the horizontal semaphore (HBS) and the vertical blocking semaphore (VBS) of the block are set to "1".

When only the coefficients in the top row of the 8×8 inverse quantized block have non-zero values, the eight pixels in each column have the same value in the spatial domain. This block may induce vertical blocking artifacts, to the VBS is set to "1". When only the coefficients in the far left column have non-zero values, the eight pixels in each row have the same value in the spatial domain. This block may induce horizontal blocking artifacts, so the HBS is set to "1".

The ringing semaphore (RS) is set to "1" if any non-zero coefficients exist in positions other than A, B and C in FIG. 2. These high-frequency coefficients mean that the block includes image edges. Therefore, the block produces ringing noise around the image edges due to the truncation of the high-frequency coefficients.

These three noise semaphore, HBS, VBS and RS, are stored in three bits for each block. No additional calculation is required to extract the semaphores.

1.2 Semaphore Propagation for inter-VOP

The blocking and the ringing semaphores in the reference VOP are propagated to the next inter-VOP by using the motion vectors. Also, the residual signal of the inter-VOP is used to decide of the semaphores of the inter-VOP.

First, the propagation of the blocking semaphore from the reference VOP to the inter-VOP will be described.

Figure 3:
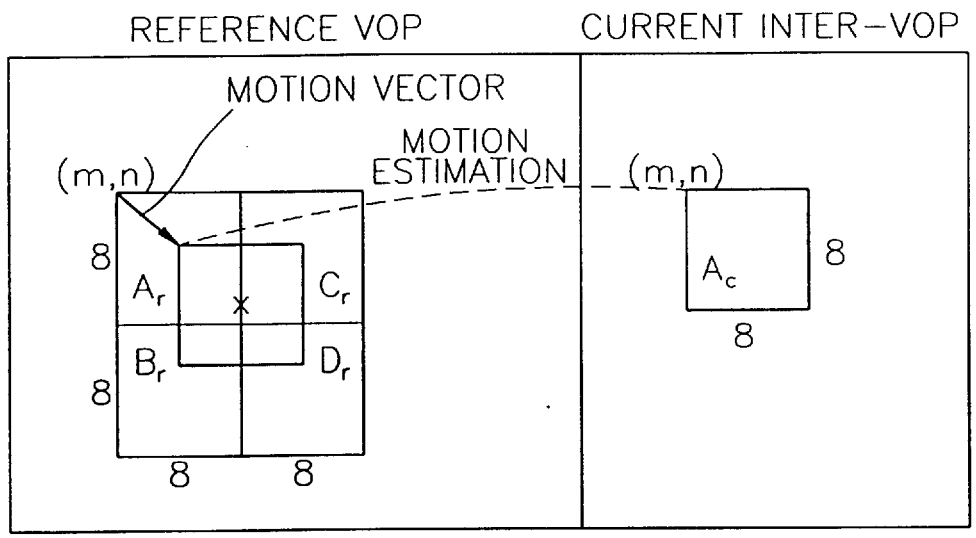
FIG. 3 shows the relationship of an 8×8 block of an inter video object plane (VOP) and adjacent blocks of a reference VOP.

FIG. 3 shows the relations of the 8×8 block, Ac, in the inter-VOP to the adjacent blocks of the reference VOP. The propagation of the blocking semaphore is described by the motion vectors MVx and Mvy as follows.

In FIG. 3, Ar, Br, Cr and Dr represents blocks of the reference VOP, and Ac is a block of the current inter-VOP, and X is a motion block of the block Ac. The motion block X is estimated using the motion vector (MVx, MVy). First, the degree of overlapping between the motion vector X and the reference blocks is investigated). The HBS and VBS of the current block Ac can be calculated by performing a bit-wise operation on the HBS and VBS of the reference blocks which are overlapped by the motion-estimated block X, provided that only those blocks for which the overlapped regions are wider than 2×2 pixel, respectively, are used in this calculation.

Figure 4:
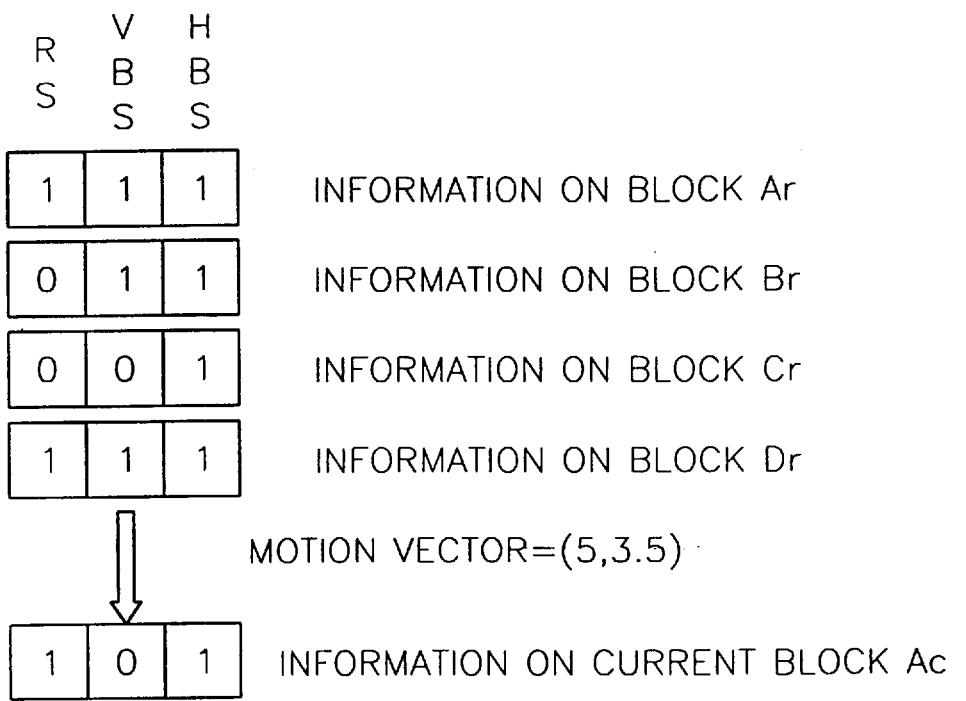
FIG. 4 is a diagram illustrating an example of extraction of a horizontal blocking semaphore (HBS), a vertical blocking semaphore (VBS) and a ringing semaphore (RS) for the inter-VOP.

For example, when MVx and MVy are equal to 5 and 3.5, respectively, the motion-estimated block X overlaps with four reference blocks Ar, Br, Cr and Dr. Here, four overlapping regions are all wider than a 2×2 pixel. Thus, the HBS and VBS of the current block Ac can be calculated from the four reference blocks Ar, Br, Cr and Dr as shown in FIG. 4. In FIG. 4, "&" represents a bit-wise AND operation, and "|" represents a bit-wise OR operation.

Next, the propagation of the ringing semaphore from the reference VOP to the inter-VOP will be described.

First, the RS of the reference block Ac is set to "1" if any IQC of the residual signals in 8×8 block of the inter-VOP is non-zero. The MPEG4 algorithm supports an 8×8 prediction mode which transmits four motion vectors for one macroblock (MB). The 8×8 prediction mode is usually applied to a busy area having high-frequency components. Thus, the RS of the block having an 8×8 prediction mode is set to "1" after checking whether or not the block has the 8×8 prediction mode. If the RS is still equal to "0" after the above decisions, the RS of the current block Ac can be calculated in the same manner as in the blocking semaphore, by performing the bit-wise OR operation on the RS of the reference blocks for which the overlapping regions are wider than 2×2 pixels. An example of the RS operation is shown in FIG. 4.

2. Image Data Post-processing Method Using Semaphore

The deblocking filter 110, the corner outlier compensator 120 and the deringing filter 130 will be described in detail.

2.1. Deblocking Filter for Reducing Blocking Artifacts

A 1-dimensional LPF for reducing blocking artifacts is strongly or weakly performed, depending on the blocking semaphore on the horizontal and vertical block boundaries. In order to reduce the blocking artifacts, most deblocking algorithms compute image-edge information and adaptively apply a LPF adaptively based on the image-edge detection. However, the proposed deblocking algorithm of the present invention does not require image-edge detection which needs a large number of computations, because it utilizes the above-obtained blocking semaphore.

The 8×8 block to be processed and the adjacent blocks are shown in FIG. 5. If the HBS of BLOCL-I and the HBS of BLOCK-J are both set to "1", a 7-tab (1,1,1,2,1,1,1) LPF is applied to pixels A, B, C, D, E and F of the horizontal block boundary of FIG. 5. Horizontal deblocking filtering can be expressed by the following algorithm.

If (HBS of BLOCK-I==1 and HBS of BLOCK-J==1)

7-tab filtering: //change A, B, C, D, E and F// else if (|D−C|<QP)

weak filtering; //change B, C, D and E//

In the above, if the horizontal blocking semaphores of BLOCK-I and BLOCK-J are set to "1", values of a predetermined number of pixels placed around a horizontal block boundary between BLOCK-I and BLOCK-J are changed. The filtering is performed on the above six pixels using the 7-tab (1,1,1,2,1,1,1) LPS.

If any horizontal blocking semaphore of the BLOCK-I and BLOCK-J is "0", the difference between the pixel values of two adjacent pixels placed around the horizontal block boundary, and QP which is the quantization factor of H.263, are compared. If the pixel value difference is smaller than QP, smaller number of pixel values compared with the filtering using the 7-tab filter are changed. That is, when filtering the pixels B, C, D and E, the pixel values of the pixels C and D are averaged while the pixel values of the pixels B and E are changed by d/8, where d is the difference between the pixels C and D.

Figure 6A:
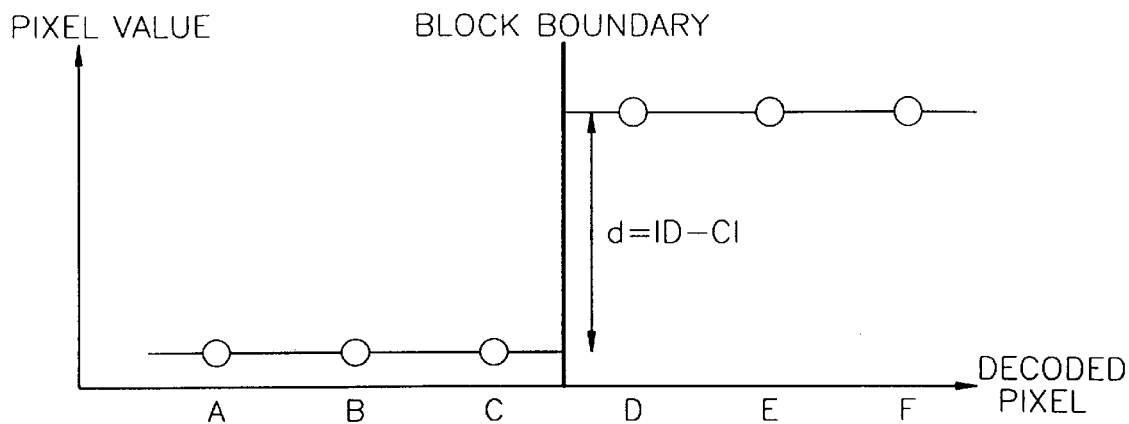
FIG. 6A is a one-dimensional view showing an example of blocking artifacts.
Figure 6B:
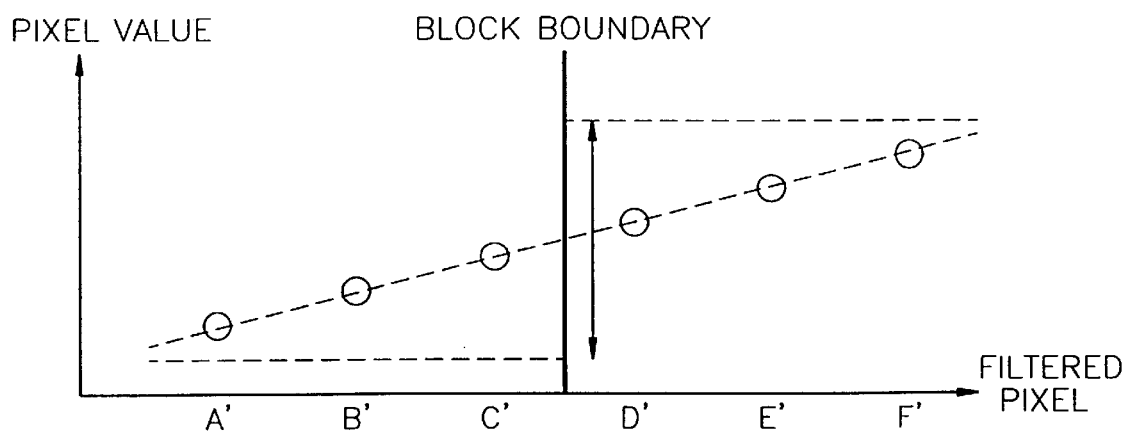
FIG. 6B shows the result of 7-tab filtering performed on the decoded pixel.
Figure 6C:
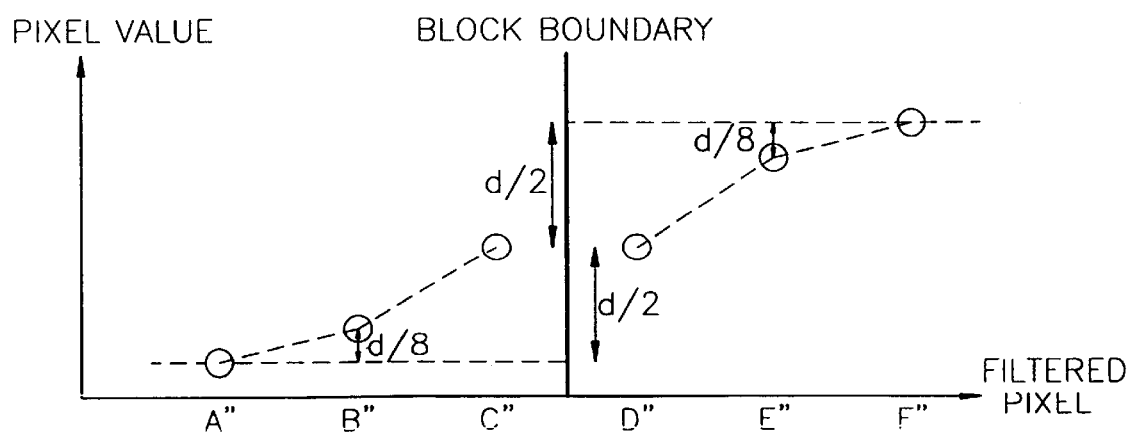
FIG. 6C shows the result of weak filtering performed on the decoded pixel.

FIG. 6A shows an example of a 1-dimensional view of the blocking artifacts, FIG. 6B shows the result after the 7-tab filtering is performed, and FIG. 6C shows the result after weak filtering is performed. The weak filtering is performed when the difference in the block boundary, d=|D−C|, is smaller than QP. Here, the parameter QP is the quantization factor of H.263. The MPEG4 supports H.263 quantization. In the case of week filtering of FIG. 6C, the boundary pixels C and D are averaged, and also the adjacent pixels B and E are slightly changed to smooth the blocking artifacts.

The deblocking filtering of the present invention changes the pixel values on the block boundary in order to reduce the 1-D artificial discontinuity. The pixels around the vertical block boundary are filtered using the vertical blocking semaphore in the same manner as in the blocks around the horizontal block boundary. That is, the vertical filtering is performed in the same manner as in the horizontal filtering. The deblocking algorithm of the present invention can be implemented in hardware by block-based parallel processing, and requires only shift and addition operations for 7-tab filtering and weak filtering. For example, in the case of the 7-tab filtering, a value C' obtained by filtering a pixel C is calculated by C'=(A+A+B+2C+D+E+F+4)/8 which includes only shift and addition operations.

2.2. Corner Outlier Compensator

A corner outlier is characterized by a pixel which is either much larger or much smaller than the neighboring pixels in the corner point of an 8×8 block of the MPEG-decompressed image as shown in FIGS. 7A, 7B and 7C. When a dark-gray region is distributed over four blocks and one or two pixels of the dark-gray region are located in the corner points of the neighboring pixels as shown in FIG. 7(A), the corner points can be distorted by quantization of the DCT coefficients as show in FIG. 7(B). Such distorted corner point is called a corner outlier. The corner outlier cannot be removed by deblocking and deringing filters. In order to reduce the corner outlier, the corner outlier must be detected and then compensated for. A simple coordination for corner outlier detection is shown in FIG. 7(C), where A, B, C and D are the pixel values of the corner points of the 8×8 blocks.

The algorithm for the corner outlier detection can be expressed as follows:

value[0]=A; value[1]==B;

value[2]=C; value[3]=D;

Average=(A+B+C+D+2)/4;

Count=0;

for(m=0; m<4; m++)

if (|value[m]-Average|>QP)

Count++; /*the number of candidate points*/ where QP represents the quantization factor of H.263, and "Count" is a variable for storing the number of candidate corner outlier pixels. If the "Count" is zero, there is no corner outlier. If A is the only candidate point in FIG. 7(C) and $|A-A_3|$ is less than 3QP/2, corner-outlier compensation is performed on A, $A_1$ and $A_2$ as follows. Assuming that the compensated values on A', $A_1$ and $A_2$ are A', $A'_1$ and $A'_2$, the compensated values A', $A'_1$ and $A'_2$ are determined by the following formula (1).

$$A'=(4A+B+C+2D+4)/8 \; A'_1=(A'+3A_1+2)/4 \; A'_2=(A'+3A_2+2)/4 \quad (1)$$

If the number of candidate points is more than 2, the candidate which has the largest difference from $(A_3+B_3+C_3+D_3+2)/4$ is selected, and corner-outlier compensation is performed on that point in the same manner as in the case of only one candidate.

2.3. Deringing Filter for Reducing Ringing Noise

Figure 8A:
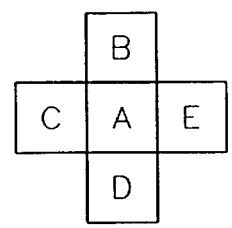
FIG. 8A shows a kernel of a 2-dimensional signal adaptive filter (2-D SAF)
Figure 8B:
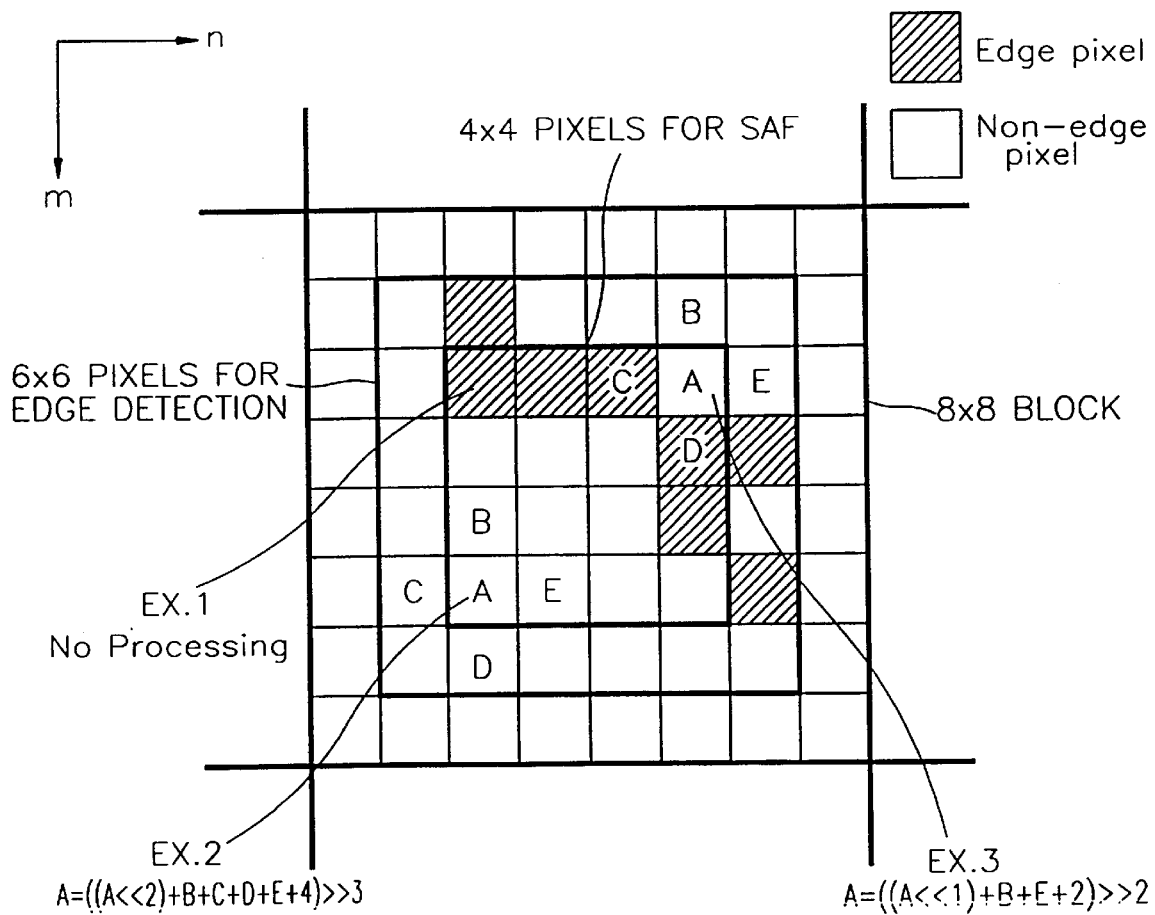
FIG. 8B shows examples of a 10×10 block for edge detection and SAF.

Prior to applying the deringing filtering for each block, the RS is investigated. If the RS of the current block is "1", deringing filtering is applied to that block. In order to prevent the image details from being distorted by filtering, simple edge detection is performed before filtering. As shown in FIGS. 8A and 8B, edge detection and 2-dimensional signal adaptive filtering (2-D SAF) are applied to an 8×8 block with a non-zero ringing semaphore. The 2-D SAF is applied to 4×4 pixels located at the center of the 8×8 block, because the boundary pixels are smoothed by deblocking filter.

First, edge detection will be explained. One-dimensional (1-D) horizontal and vertical gradient operators are applied to the reconstructed blocks so as to find the image edges. The threshold value for deciding the edge pixels is selected from the quantization factor QP of the H.263. For applying 2-D SAF to 4×4 pixels, edge information must be obtained for a 6×6 block, which is the current block, as shown in FIG. 8B. Assuming that there are a pixel[m][n] and a pixel[m][n+1] which is the pixel to the right of the pixel[m][n], and a pixel[m][n−1] which is the pixel to the left of the pixel[m][n], the difference between the pixel[m][n] and pixel[m][n+1] is A1, the difference between the pixel[m][n] and pixel[m][n−1] is A2, and quantization factor of the H.263 is QP, the horizontal edge detection is performed by the following logical formula ((A1>QP) and (A2>QP)) or (A1>2QP) or (A2>2QP). If the logical formula is satisfied, the pixel[m][n] is determined as an edge and the edge map Edge[m][n] becomes 1.

Assuming that there are a pixel[m][n], a pixel[m+1][n] which is the pixel above the pixel[m][n], and a pixel[m−1][n] which is the pixel below the pixel[m][n], difference between the pixel[m][n] and pixel[m+1][n] is A'1, the difference between the pixel[m][n] and pixel[m−1][n] is A'2, and quantization factor of the H.263 is QP, the horizontal edge detection is performed by the following logical formula ((A'1>QP) and (A'2>QP)) or (A'1>2QP) or (A'2>2QP). If the logical formula is satisfied, the pixel[m][n] is determined as an edge and the edge map Edge[m][n] becomes 1.

The edge map, Edge[m][n], is obtained from the pixel value, pixel[m][n], by the following algorithm.

```
/* horizontal edge detection */
A1=|pixel[m][n]-pixel[m][n+1]|;
A2=|pixel[m][n]-pixel[m][n-1]|;
    if(((A1>QP) and (A2>QP)) or (A1>2QP) or (A2>2QP))
        Edge[m][n]=1;
    else{ /*vertical edge detection*/
        A'1=|pixel[m][n]-pixel[m+1][n]|;
        A'2=|pixel[m][n]-pixel[m-1][n]|;
        if (((A'1>QP) and (A'2>QP)) or (A'1>2QP) or
           (A'2>2QP)) Edge[m][n]=1;
    }
```

Next, deringing filtering using a 2-dimensional signal adaptive filter (2-D SAF) will be described. The deringing filtering is proposed to smooth the ringing noise without significant loss of image details. The deringing filtering of the present invention is a simple convolution operation in which weighting factors for the convolution vary according to the edge map. The SAF is applied to the decoded block by using Edge[m][n]. FIG. 8A shows a kernel for the 2-D SAF. When the central point A of the filter window in FIG. 8B is on the edge pixel, the 2-D filtering operation is not performed (EX.1 of FIG. 8B). If an edge point is not included in the 4-connected filter window, low-pass filtering is performed (EX.2 of FIG. 8B). If some edge points, not on the center point, are in the 4-connected filter window, weighted filtering to exclude the edge pixels is performed (EX. 3 of FIG. 8B). The weighting factors are defined in consideration of computation complexity, so SAF filtering can be performed by simple shift and addition operations as shown in Table. 1.

TABLE 1

| A | B | C | D | E | SAF |
|---|---|---|---|---|-----|
| 0 | 0 | 0 | 0 | 0 | A = (4A + B + C + D + E + 4)/8 |
| 0 | 0 | 0 | 0 | 1 | A = (4A + B + 2C + D + 4)/8 |
| 0 | 0 | 0 | 1 | 0 | A = (4A + 2B + C + D + 4)/8 |
| 0 | 0 | 0 | 1 | 1 | A = (2A + B + C + 2)/4 |

TABLE 1-continued

| A | B | C | D | E | SAF |
|---|---|---|---|---|-----|
| 0 | 0 | 1 | 0 | 0 | A = (4A + B + D + 2E + 4)/8 |
| 0 | 0 | 1 | 0 | 1 | A = (2A + B + D + 2)/4 |
| 0 | 0 | 1 | 1 | 0 | A = (2A + B + E + 2)/4 |
| 0 | 0 | 1 | 1 | 1 | A + (A + B + 1)/2 |
| 0 | 1 | 0 | 0 | 0 | A = (4A + C + 2D + E + 4)/8 |
| 0 | 1 | 0 | 0 | 1 | A = (2A + C + D + 2)/4 |
| 0 | 1 | 0 | 1 | 0 | A = (2A + C + E + 2)/4 |
| 0 | 1 | 0 | 1 | 1 | A = (A + C + 1)/2 |
| 0 | 1 | 1 | 0 | 0 | A = (2A + D + E + 2)/4 |
| 0 | 1 | 1 | 0 | 1 | A = (A + D + 1)/2 |
| 0 | 1 | 1 | 1 | 0 | A = (A + E + 1)/2 |
| 0 | 1 | 1 | 1 | 1 | A = 4 |

In Table 1, "0" represents a non-edge, and "1" represents an edge.

The present invention may be embodied as a program capable of being run by a computer, and the invention may be embodied in a general purpose digital computer that is running the program from a computer usable medium including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet).

Hence, the present invention may be embodied as a computer usable medium having a computer readable program code unit embodied therein for image data post-processing for reducing quantization effect induced when image data compressed based on a block is decoded, the computer readable program code means in the computer usable medium comprising: computer readable program code means for detecting semaphore representing whether or not post-processing is required, using distribution of inverse quantization coefficients of inverse-quantized image data and a motion vector representing the difference between the blocks of a previous video object plane (VOP) and blocks of a current VOP; and computer readable program code means for filtering the decoded image data corresponding to the semaphore by a predetermined method, if it is determined by checking the detected semaphore that post-processing is required.

A functional program, code and code segments, used to implement the present invention can be derived by a skilled computer programmer from the description of the invention contained herein.

When images are highly compressed, the decompressed images produce quantization effects such as blocking artifacts, corner outlier and ringing noise. As described above, the post-processing method of the present invention reduces the quantization effects of the decomposed images by using semaphores and adaptive filters. The blocking and ringing semaphores of each block greatly contribute to reducing the computation complexity of post-filtering. The motion vectors in the inter-VOP are used to extract the blocking and the ringing semaphores for the current block.

In video coding, both the computation complexity and the PSNR must be considered for high image quality and for easy implementation in the hardware and software. From the aspect of hardware complexity, the algorithm of the present invention can be performed by parallel processing without multiplication and division operations.

Industrial Applicability

The post-processing method of the present invention can be widely used, because it significantly enhances the subjective quality while maintaining image details. The proposed algorithm of the present invention can be applied to JPEG, H.263+, MPEG-1 and MPEG4 decompressed images.

What is claimed is:

1. An image data post-processing method for reducing quantization effect induced when image data compressed based on a block is decoded, the method comprising the steps of:

detecting semaphore representing whether or not post-processing is required with reference to distribution of inverse quantization coefficients of the image data in an intra video object plane (VOP) coding mode, and a motion vector representing a difference between blocks of previous VOP and blocks of the current VOP in an inter-VOP coding mode; and determining whether or not post-processing is required, based on the detected semaphore.

2. An image data post-processing method for reducing quantization effect induced when image data compressed based on a block is decoded, the method comprising:

(a) detecting a semaphore representing whether post-processing is required, using distribution of inverse quantization coefficients of inverse-quantized image data and a motion vector representing the difference between blocks of a previous video object plane (VOP) and blocks of a current VOP; and (b) filtering a decoded image data corresponding to the semaphore, if it is determined by checking the detected semaphore that post-processing is required.

3. The method of claim 2, wherein the step (a) is performed on an intra-VOP in an intra-VOP mode, and on an inter-VOP in an inter-VOP mode.

4. The method of claim 3, wherein the semaphore includes a blocking semaphore representing whether reduction of blocking artifacts near block boundaries is required, and a ringing semaphore representing whether reduction of ringing noise near image edges is required.

5. The method of claim 4, wherein the blocking semaphore and the ringing semaphore associated with the intra-VOP are detected by investigating distribution of inverse quantization coefficients said inverse quantization coefficients being discrete cosine transform (DCT) coefficients after a compressed bitstream is inverse quantized.

6. The method of claim 5, wherein the blocking semaphore comprises a horizontal blocking semaphore (HBS) and a vertical blocking semaphore (VBS), wherein an uppermost and leftmost pixel of the block, being pixel A, said block being inverse quantized 8×8 block comprising 64 pixels, and a pixel to the right of the pixel A being pixel B, and a pixel below the pixel A being pixel C, and the HBS and the VBS are extracted by:

(a) calculating discrete cosine transform (DCT) coefficients on the inverse-quantized 8×8 block after compressed image data is inversely quantized;

(b) setting the HBS and the VBS to "1" meaning that post-processing is required, if only a coefficient of the pixel A is non-zero;

(c) setting the VBS to "1" meaning that post-processing is required, if only a top row of the inverse-quantized 8×8 block includes non-zero coefficient pixel; and (d) setting the HBS to "1" meaning that post-processing is required, if on the leftmost column of the inverse-quantized 8×8 block includes a non-zero coefficient pixel.

7. The method of claim 5, wherein an uppermost and leftmost pixel of the block, being pixel A, said block being inverse quantized 8×8 block comprising 64 pixels, a pixel to the right of the pixel A is a pixel B, and the pixel below the pixel A is a pixel C, the ringing semaphore (RS) of the intra-VOP is set to "1" meaning that post-processing is required, if any pixel other than the pixels A, B and C of the inverse-quantized 8×8 block has a non-zero coefficient.

8. The method of claim 7, wherein the pixel to the right of the pixel C is a pixel D, the ringing semaphore of the intra-VOP is set to "1" meaning that post-processing is required, if any pixel other than the pixels A, B, C and D of the inverse-quantized 8×8 block has a non-zero coefficient.

9. The method of claim 4, wherein the blocking semaphore associated with the current inter-VOP comprises a horizontal blocking semaphore (HBS) and a vertical blocking semaphore (VBS), and wherein a reference VOP comprises reference blocks, and a block of the reference VOP predicted by a motion vector (MVx,MVy) of a block Ac of the current inter-VOP is a motion block X, the HBS and the VBS of the block Ac are extracted by:

checking a degree of overlapping between the motion block X and the reference blocks;

performing a bit-wise AND operation on the HBS and VBS of the reference blocks in which a number of the overlapped pixels is more than a predetermined number; and setting the HBS and the VBS of the block Ac to the result of the bitwise AND operation.

10. The method of claim 9, wherein the predetermined number of the overlapped pixels is 2×2 pixels.

11. The method of claim 9, wherein filtering is further performed by:

(a) changing a predetermined number of pixel values of a horizontal block boundary between a block I and a block J adjacent to the block I if the HBSs of the blocks I and J are set to "1";

(b) comparing a difference between the values of two pixels adjacent to each other around the horizontal block boundary with a quantization factor (QP) of the H.263 if the HBS of either the block I or the block J is zero, and changing the values of the pixels whose number is less than the presetermined number in the step (a) if the difference of the pixels is less than the QP, wherein the filtering on pixels around a vertical block boundary is performed using the VBS in a same manner as in pixels around a horizontal block boundary.

12. The method of claim 11, wherein six pixels around the horizontal block boundary between the blocks I and J are pixels A, B, C, D, E and F, the pixels C and D are nearest to the horizontal block boundary, the pixels A and F are farthest to the horizontal block boundary, and the pixels B and E are located at the middle of the pixels A and C, and pixels D and F, low-pass filtering on the six pixels is performed using a 7-tab (1,1,1,2,1,1,1) low pass filter in the step (a), and the filtering of the step (b) is performed on the pixels B, C, D and E, wherein when a difference between the pixels C and D is d, the pixels C and D are filtered as an average of the pixels C and D, and the filtered pixels B and E are different from the pixels B and E, respectively, by d/8.

13. The method of claim 4, wherein a reference VOP comprises reference blocks, and a block of the reference VOP predicted by a motion vector (MVx,MVy) of a block Ac of the current inter-VOP is a motion block X, the ringing semaphore (RS) of the block Ac is extracted by:

setting the RS of Ac to "1" if an inverse quantized coefficient (IQC) of a residual signal in an 8×8 block of the inter-VOP is non-zero;

setting the RS of the block to "1" in an 8×8 prediction mode which is supported by an MPEG-4 algorithm and transfers four motion vectors on one macroblock (MB); and checking a degree of overlapping between the motion block X and the reference blocks, if the RS is still zero, and performing a bit-wise OR operation on the RS if the reference blocks in which the number of the overlapped pixels is more than a predetermined number, and setting the RS of the block Ac to the result of the bit-wise OR operation.

14. The method of claim 13, wherein a filtering step comprises:

detecting horizontal and vertical edges of image data; and performing 2-dimensional adaptive signal filtering on an 8×8 block requiring reduction of ringing noise, wherein a pixel within a block is pixel[m][n], a pixel to the right of the pixel[m][n] is pixel[m][n+1], a pixel to the left of the pixel[m][n] is pixel[m][n−1], the difference between the pixel[m][n] and the pixel[m][n+1] is A1, and the difference between the pixel[m][n] and the pixels[m][n+1] is A2, and the quantization factor of the H.263 is QP, the horizontal edge detection is performed by a logical formula ((A1>QP) and (A2>QP)) or (A1>2QP) or (A2>2QP) wherein the pixel[m][n] is determined as edge and edge map Edge[m][n] is set to "1" if the logical formula is satisfied, and when a pixel above the pixel[m][n] is pixel[m+1][n], a pixel below the pixel[m][n] is pixel[m−1][n], a difference between the pixel[m][n] and the pixel[m+1][n] is A'1, a difference between the pixel[m][n] and the pixel[m−1][n] is A'2, and the quantization factor of the H.263 is QP, the vertical edge detection is performed by a logical formula ((A'1>QP) and (A'2>QP)) or (A'1>2QP) or (A'2>2QP) wherein the pixel[m][n] is determined as edge and edge map Edge[m][n] is set to "1" if the logical formula is satisfied, and signal adaptive filtering is performed by applying a 4-connected filter window to the 8×8 block, wherein filtering is not performed if a central pixel of the filter window is an edge, and weighted filtering is performed if a central pixel of the filter window is a non-edge pixel.

15. An edge detection method for deringing filtering to reduce ringing noise, the method comprising:

detecting a horizontal edge of an image data; and detecting a vertical edge of the image data, wherein when a pixel within a block is pixel[m][n], a pixel to the right of the pixel[m][n] is pixel[m][n+1], a pixel to the left of the pixel[m][n] is pixel[m][n−1], the difference between the pixel[m][n] and the pixel[m][n+1] is A1, and a difference between the pixel[m][n] and the pixels[m][n+1] is A2, and a quantization factor of H.263 is QP, horizontal edge detection is performed by a logical formula ((A1>QP) and (A2>QP)) or (A1>2QP) or (A2>2QP) wherein the pixel[m][n] is determined to be an edge if the logical formula is satisfied, and when the pixel above the pixel[m][n] is pixel[m+1][n], the pixel below the pixel[m][n] is pixel[m−1][n], the difference between the pixel[m][n] and the pixel[m+1][n] is A'1, the difference between the pixel[m][n] and the pixel[m−1][n] is A'2, and the quantization factor of H.263 is QP, vertical edge detection is performed by a logical formula ((A'1>QP) and (A'2>QP)) or (A'1>2QP) or (A'2>2QP) wherein the pixel[m][n] is determined to be an edge if the logical formula is satisfied.

16. A deringing filtering method for reducing ringing noise, comprising:

detecting horizontal and vertical edges of image data; and performing 2-D signal adaptive filtering on a block requiring reduction of ringing noise, wherein when a pixel within the block is pixel[m][n], a pixel to the right of the pixel[m][n] is pixel[m][n+1], a pixel to the left of the pixel[m][n] is pixel[m][n−1], a difference between the pixel[m][n] and the pixel[m][n+1] is A1, and a difference between the pixel[m][n] and the pixels[m][n+1] is A2, and a quantization factor of H.263 is QP, a horizontal edge detection is performed by a logical formula ((A1>QP) and (A2>QP)) or (A1>2QP) or (A2>2QP) wherein the pixel[m][n] is determined to be an edge if the logical formula is satisfied, and when a pixel above the pixel[m][n] is pixel[m+1][n], a pixel below the pixel[m][n] is pixel[m−1][n], a difference between the pixel[m][n] and the pixel[m+1][n] is A'1, a difference between the pixel[m][n] and the pixel[m−1][n] is A'2, the vertical edge detection is performed by a logical formula ((A'1>QP) and (A'2>QP)) or (A'1>2QP) or (A'2>2QP) wherein the pixel[m][n] is determined to be an edge if the logical formula is satisfied, and signal adaptive filtering is performed by applying a 4-connected filter window to the block, wherein filtering is not performed if a central pixel of the filter window is an edge pixel, and weighted filtering is performed if the central pixel of the filter window is a non-edge pixel.

17. A method of detecting corner outliers occurring at a corner of a cross point where four blocks meet when image data compressed based on a block are decoded, when four pixels around the cross point are pixels A, B, C and D, value[0] is A, value[1] is B, value[2] is C, value[3] is D, (A+B+C+D+2)/4 is Average, $A_1 0$ and $A_2 0$ are pixels adjacent to the pixel A in a block to which the pixel A belongs, $A_3 0$ is a pixel diagonal to the pixel A, $B_1 0$ and $B_2 0$ are pixels adjacent to the pixel B in a block to which the pixel B belongs, $B_3 0$ is a pixel diagonal to the pixel B, $C_1 0$ and $C_2 0$ are pixels adjacent to the pixel C in a block to which the pixel C belongs, $C_3 0$ is a pixel diagonal to the pixel C, $D_1 0$ and $D_2 0$ are pixels adjacent to the pixel D in a block to which the pixel D belongs, and $D_3 0$ is a pixel diagonal to the pixel D, the method comprising:

(a) comparing a difference between the value[0] and the Average with the quantization factor (QP) of H.263, and designating the pixel A as the corner outlier candidate pixel if the difference is greater than the QP;

(b) performing the step (a) on the value[1], value[2] and value[3] to designate a corresponding pixel as a corner outlier candidate pixel; and (c) designating the candidate pixel as a corner outlier pixel if the corner outlier candidate pixel is only one, and designating the candidate pixel having the greatest difference from $(A_3+B_3+C_3+D_3+2)/4$ as a corner outlier pixel if there are two or more corner outlier candidate pixels.

18. A method of compensating for detected corner outliers occurring at a corner of a cross point where four blocks meet when image data compressed based on a block are decoded, assuming that four pixels around the cross point are pixels A, B, C and D, value[0] is A, value[1] is B, value[2] is C, value[3] is D, (A+B+C+D+2)/4 is Average, $A_1 0$ and $A_2 0$ are pixels adjacent to the pixel A in a block to which the pixel A belongs, $A_3 0$ is a pixel diagonal to the pixel A, $B_1 0$ and $B_2 0$ are pixels adjacent to the pixel B in a block to which the pixel B belongs, $B_3 0$ is a pixel diagonal to the pixel B, $C_1 0$ and $C_2 0$ are pixels adjacent to the pixel C in a block to which the pixel C belongs, $C_3 0$ is a pixel diagonal to the pixel C, $D_1 0$ and $D_2 0$ are pixels adjacent to the pixel D in a block to which the pixel D belongs, and $D_3 0$ is a pixel diagonal to of the pixel D, the method comprising the steps of:

compensating for the pixel A by (4A+B+C+2D+4)/8, the pixel $A_1$ by $(A'+3A_1+2)/4$, the pixel $A_2$ by $(A'+3A_2+2)/4$, if the corner outlier pixel is A and the difference between the pixels A and $A_3$ is less than 3QP/2;

compensating for the pixel B by (4B+C+D+2A+4)/8, the pixel $B_1$ by $(B'+3B_1+2)/4$, the pixel $B_2$ by $(B'+BA_2+2)/4$, if the corner pixel is B and the difference between the pixels B and $B_3$ is less than 3QP/2;

compensating for the pixel C by (4C+D+A+2B+4)/8, the pixel $C_1$ by $(C'+3C_1+2)/4$, the pixel $C_2$ by $(C'+3C_2+2)/4$, if the corner pixel is C and the difference between the pixels C and $C_3$ is less than 3QP/2; and compensating for the pixel D by (4D+A+B+2C+4)/8, the pixel $D_1$ by $(D'+3D_1+2)/4$, the pixel $D_2$ by $(D'+3D_2+2)/4$, if the corner pixel is D and the difference between the pixels D and $D_3$ is less than 3QP/2.

19. An image data post-processing method for reducing corner outliers occurring at a corner of a cross point where four blocks meet when image data compressed based on a block are decoded, the method comprising:

(a) detecting corner outliers from the block of inverse-quantized image data; and (b) compensating for the detected corner outliers, wherein when four pixels around the cross point are pixels A, B, C and D, value[0] is A, value[1] is B, value[2] is C, value[3] is D, (A+B+C+D+2)/4 is Average, $A_1 0$ and $A_2 0$ are pixels adjacent to the pixel A in a block to which the pixel A belongs, $A_3 0$ is a pixel diagonal to the pixel A, $B_1 0$ and $B_2 0$ are pixels adjacent to the pixel B in a block to which the pixel B belongs, $B_3 0$ is a pixel diagonal to the pixel B, $C_1 0$ and $C_2 0$ are pixels adjacent to the pixel C in the block to which the pixel C belongs, $C_3 0$ is a pixel diagonal to the pixel C, $D_1 0$ and $D_2 0$ are pixels adjacent to the pixel D in a block to which the pixel D belongs, and $D_3 0$ is a pixel diagonal to the pixel D, the step (a) comprises the sub-steps of:

(a1) comparing a difference between the value[0] and the Average with the quantization factor (QP) of H.263, and designating the pixel A as the corner outlier candidate pixel if the difference is greater than the QP;

(a2) performing the step (a1) on the value[1], value[2] and value[3] to designate a corresponding pixel as a corner outlier candidate pixel; and (a3) designating the candidate pixel as a corner outlier pixel if the corner outlier candidate pixel is only one, and designating the candidate pixel having the greatest difference from $(A_3+B_3+C_3+D_3+2)/4$ as a corner outlier pixel if there are two or more corner outlier candidate pixels, and wherein the step (b) is performed by compensating for the pixel A by (4A+B+C+2D+4)/8, the pixel A1 by $(A'+3A_1+2)/4$, the pixel $A_2$ by $(A'+3A_2+2)/4$, if the corner outlier pixel is A and the difference between the pixels A and $A_3$ is less than 3QP/2; compensating for the pixel B by (4B+C+D+2A+4)/8, the pixel $B_1$ by $(B'+3B_1+2)/4$, the pixel $B_2$ by $(B'+BA_2+2)/4$, if the corner outlier pixel is B and the difference between the pixels B and $B_3$ is less than 3QP/2; compensating for the pixel C by (4C+D+A+2B+4)/8, the pixel $C_1$ as $C_1'$ by $(C'+3C_1+2)/4$, the pixel $C_2$ by $(C'+3C_2+2)/4$, if the corner outlier pixel is C and the difference between the pixels C and $C_3$ is less than 3QP/2; and compensating for the pixel D by (4D+A+B+2C+4)/8, the pixel $D_1$ as $D_1'$ by $(D_1+3D_1+2)/4$, the pixel $D_2$ by $(D'+3D_2+2)/4$, if the corner outlier pixel is D and the difference between the pixels D and $D_3$ is less than 3QP/2.

20. An image data post-processing method for reducing quantization effect induced when image data compressed based on a block is decoded, the method comprising:

(a) detecting a semaphore representing whether post-processing is required, using distribution of inverse quantization coefficients of inverse-quantized image data and a motion vector representing a difference between blocks of previous video object plane (VOP) and blocks of a current VOP; and (b) detecting a corner outlier pixel of the inverse-quantized image data block, when four pixels around the cross point are pixels A, B, C and D, value[0] is A, value[1] is B, value[2] is C, value[3] is D, (A+B+C+D+2)/4 is Average, $A_1 0$ and $A_2 0$ are pixels adjacent to the pixel A in a block to which the pixel A belongs, $A_3 0$ is a pixel diagonal to the pixel A, $B_1 0$ and $B_2 0$ are pixels adjacent to the pixel B in a block to which the pixel B belongs, $B_3 0$ is a pixel diagonal to the pixel B, $C_1 0$ and $C_2 0$ are pixels adjacent to the pixel C in a block to which the pixel C belongs, $C_3 0$ is a pixel diagonal to the pixel C, $D_1 0$ and $D_2 0$ are pixels adjacent to the pixel D in a block to which the pixel D belongs, and $D_3 0$ is a pixel diagonal to the pixel D, by:

(b1) comparing a difference between the value[0] and the Average with the quantization factor (QP) of H.263, and designating the pixel A as the corner outlier candidate pixel if the difference is greater than the QP; and (b2) performing the step (b1) on the value[1], value[2] and value[3] to count the corresponding pixel as a corner outlier candidate pixel;

(c) filtering the decoded image data corresponding to the semaphore, if it is determined by checking the detected semaphore that the post-process is required; and (d) designating the pixel as a corner outlier pixel if the corner outlier candidate pixel is only one and then compensating for the pixel by a predetermined method if the difference between the pixel and a pixel diagonal to the pixel is less than 3QP/2, and designating the candidate pixel having a greatest difference from $(A_3+B_3+C_3+D_3+2)/4$ as a corner outlier pixel if there are two or more corner outlier candidate pixels and then compensating for the detected candidate pixel by the predetermined method.

21. The method of claim 20, wherein if the detected corner outlier pixel is A and the difference between the pixels A and $A_3$ is less than 3QP/2, the pixel A is compensated by (4A+B+C+2D+4)/8, the pixel $A_1$ as $A_1'$ by $(A'+3A_1+2)/4$, the pixel $A_2$ by $(A'+3A_2+2)/4$, and if the detected corner outlier pixel is B and the difference between the pixels B and $B_3$ is less than 3QP/2, the pixel B is compensated by (4B+C+D+2A+4)/8, the pixel $B_1$ by $(B'+3B_1+2)/4$, the pixel $B_2$ by $(B'+3B_2+2)/4$, and if the detected corner outlier pixel is C and the difference between the pixels C and $C_3$ is less than 3QP/2, the pixel C is compensated by (4C+D+A+2B+4)/8, the pixel $C_1$ by (C'+3$C_1$+2)/4, the pixel $C_2$ by (C'+3$C_2$+2)/4, and if the detected corner outlier pixel is D and the difference between the pixels D and $D_3$ is less than 3QP/2, the pixel D is compensated by (4D+A+B+2C+4)/8, the pixel $D_1$ by (D'+3$D_1$+2)/4, the pixel $D_2$ by (D'+3$D_2$+2)/4.

22. An image data post-processing apparatus for reducing quantization effect induced when image data compressed based on a block is decoded, the apparatus comprising:
   a semaphore detector for detecting a semaphore representing whether post-processing is required, using distribution of inverse quantization coefficients of inverse-quantized image data and a motion vector representing the difference between blocks of previous video object plane (VOP) and blocks of a current VOP wherein the semaphore includes a blocking semaphore representing whether reducing blocking artifacts near block boundaries is required, and a ringing semaphore representing whether or reducing ringing noise near image edges is required;
   a deblocking filter for checking the blocking semaphore detected by the semaphore detector and performing deblocking filtering on the decoded image data;
   a corner outlier compensator for detecting a corner outlier from the data passed through the deblocking filtering and compensating for the detected corner outlier; and
   a deringing filter for checking the ringing semaphore detected by the semaphore detector and performing deringing filtering on the corner outlier compensated data.

23. The apparatus of claim 22, wherein the semaphore detector detects the semaphore on an intra-VOP and an inter-VOP, and the semaphore detection on the intra-VOP is performed by using a distribution of inverse quantization coefficients which are discrete cosine transform (DCT) coefficients of the inverse-quantized image data, and the semaphore detection on the inter-VOP is performed using a motion vector representing the difference between the blocks of previous VOP and the blocks of the current VOP.

24. The apparatus of claim 22, wherein the deblocking filter is 1-dimensional horizontal and vertical low pass filters.

25. The apparatus of claim 22, wherein the deringing filter ia a 2-dimensional signal adoptive filter.

26. A computer readable medium having embodied thereon a computer program for image data post-processing capable of reducing quantization effect induced when image data compressed based on a block is decoded,
   wherein the image data post-processing method comprises:
   detecting a semaphore representing whether post-processing is required on an intra video object plane (VOP) in an intra-VOP mode and an inter-VOP in an inter-VOP mode, by investigating a distribution of inverse quantization coefficients of inverse-quantized image data and calculating a motion vector representing a difference between blocks of previous VOP and blocks of current VOP; and
   filtering the decoded image data corresponding to the semaphore, if it is determined by checking the detected semaphore that post-processing is required.

27. The computer readable medium of claim 26, wherein the semaphore includes a blocking semaphore representing whether reduction of blocking artifacts near block boundaries is required, and a ringing semaphore representing whether reduction of ringing noise near image edges is required, and
when an uppermost and leftmost pixel of the block, is pixel A said block being inverse quantized 8×8 block comprising 64 pixels, a pixel to a right of the pixel A is a pixel B, and a pixel below the pixel A is a pixel C, when the blocking semaphore corresponding to the intra-VOP comprises a horizontal blocking semaphore (HBS) and a vertical blocking semaphore (VBS), the HBS and the VBS of the intra-VOP are extracted by:
   (a) calculating discrete cosine transform (DCT) coefficients on the inverse-quantized 8×8 block after compressed image data is inversely quantized;
   (b) setting the HBS and the VBS to "1" meaning that post-processing is required, if only a coefficient of the pixel A is non-zero;
   (c) setting the VBS to "1" meaning that post-processing is required, if only a top row of the inverse-quantized 8×8 block includes non-zero coefficient pixel; and
   (d) setting the HBS to "1" meaning that post-processing is required, if on the leftmost column of the inverse-quantized 8×8 block includes a non-zero coefficient pixel, and
the ringing semaphore (RS) of the intra-VOP is set to "1" meaning that post-processing is required, if any pixel other than the pixels A, B and C of the inverse-quantized 8×8 block has a non-zero coefficient, and
the blocking semaphore corresponding to a current inter-VOP comprises a inter-VOP horizontal blocking semaphore (HBS) and a inter-VOP vertical blocking semaphore (VBS), and when a reference VOP comprises reference blocks, and the block of the reference VOP predicted by a motion vector (MVx,MVy) of a block Ac of the current inter-VOP is a motion block X, the inter-VOP HBS and the inter-VOP VBS of the block Ac are extracted by:
   checking the degree of overlapping between the motion block X and the reference blocks;
   performing a bit-wise AND operation on the inter-VOP HBS and the inter-VOP VBS of the reference blocks in which the number of the overlapped pixels is more than a predetermined number; and
   setting the inter-VOP HBS and the inter-VOP VBS of the block Ac to the result of the bit-wise AND operation.

28. The computer readable medium of claim 26, wherein when a reference VOP comprises predetermined reference blocks, and the block of the reference VOP predicted by a motion vector (MVx,MVy) of a block Ac is a motion block X, the ringing semaphore (RS) of the block Ac of the current inter-VOP is extracted by:
   setting the RS of the current block Ac to "1" if an inverse quantized coefficient (IQC) of a residual signal in the 8×8 block of the inter-VOP is non-zero;
   setting the RS to "1" in an 8×8 prediction mode which is supported by the MPEG-4 algorithm and transfers four motion vectors on one macroblock (MB); and
   checking a degree of overlapping between the motion block X and the reference blocks, if the RS is still zero, and performing a bit-wise OR operation on the RS of the reference blocks in which the number of the overlapped pixels is more than a predetermined number, to set the RS of the block Ac of the current VOP to the result of the bit-wise OR operation.

29. The computer readable medium of claim 28, wherein the filtering step comprises:
   detecting horizontal and vertical edges of image data; and
   performing 2-dimensional adaptive signal filtering on an 8×8 block requiring reduction of ringing noise, wherein a pixel within a block is pixel[m][n], a pixel to the right of the pixel[m][n] is pixel[m][n+1], a pixel to the left of the pixel[m][n] is pixel[m][n−1], the difference between the pixel[m][n] and the pixel[m][n+1] is A1, and the difference between the pixel[m][n] and the pixels[m][n+1] is A2, and the quantization factor of the H.263 is QP, the horizontal edge detection is performed by a logical formula ((A1>QP) and (A2>QP)) or (A1>2QP) or (A2>2QP) wherein the pixel[m][n] is determined as edge and edge map Edge[m][n] is set to "1" if the logical formula is satisfied, and when a pixel above the pixel[m][n] is pixel[m+1][n], a pixel below the pixel[m][n] is pixel[m−1][n], a difference between the pixel[m][n] and the pixel[m+1][n] is A'1, a difference between the pixel[m][n] and the pixel[m−1][n] is A'2, and the quantization factor of the H.263 is QP, the vertical edge detection is performed by a logical formula ((A'1>QP) and (A'2>QP)) or (A'1>2QP) or (A'2>2QP) wherein the pixel[m][n] is determined as edge and edge map Edge[m][n] is set to "1" if the logical formula is satisfied, and signal adaptive filtering is performed by applying a 4-connected filter window to the 8×8 block, wherein filtering is not performed if a central pixel of the filter window is an edge, and weighted filtering is performed if a central pixel of the filter window is a non-edge pixel.

30. The computer readable medium of claim 26, wherein filtering is performed by:

(a) changing a predetermined number of pixel values of a horizontal block boundary between a block I and a block J adjacent to the block I if the HBSs of the blocks I and J are set to "1";

(b) comparing a difference between values of two pixels adjacent to each other around the horizontal block boundary with a quantization factor (QP) of H.263 if the HBS of either the block I or the block J is zero, and changing the values of the pixels whose number is less than in the step (a) if the difference of the pixels is less than the QP, wherein the filtering on the pixels around the vertical block boundary is performed using the VBS in a same manner as in the pixels around the horizontal block boundary, and when six pixels around the horizontal block boundary between the blocks I and J are pixels A, B, C, D, E and F, the pixels C and D are nearest to the horizontal block boundary, the pixels A and F are farthest to the horizontal block boundary, and the pixels B and E are located at the middle of the pixels A and C, and pixels D and F, low-pass filtering on the 6 pixels is performed using a 7-tab (1,1,1,2,1,1,1) low pass filter in the step (a), and the filtering of the step (b) is performed on the pixels B, C, D and E, wherein assuming that a difference between the pixels C and D is d, the pixels C and D are filtered as an average of the pixels C and D, and the filtered pixels B and E are different from the pixels B and E, respectively, by d/8.

31. A computer readable medium having embodied thereon a computer program for image data post-processing capable of reducing corner outliers occurring at the corner of a cross point where four blocks meet when image data compressed based on a block are decoded, wherein the image data post-processing method comprises:

(a) detecting corner outliers from the block of inverse-quantized image data; and (b) compensating for the detected corner outliers, wherein when four pixels around the cross point are pixels A, B, C and D, value[0] is A, value[1] is B, value[2] is C, value[3] is D, $(A+B+C+D+2)/4$ is Average, $A_1 0$ and $A_2 0$ are pixels adjacent to the pixel A in a block to which the pixel A belongs, $A_3 0$ is a pixel diagonal to the pixel A, $B_1 0$ and $B_2 0$ are pixels adjacent to the pixel B in a block to which the pixel B belongs, $B_3 0$ is a pixel diagonal to the pixel B, $C_1 0$ and $C_2 0$ are pixels adjacent to the pixel C in the block to which the pixel C belongs, $C_3 0$ is a pixel diagonal to the pixel C, $D_1 0$ and $D_2 0$ are pixels adjacent to the pixel D in a block to which the pixel D belongs, and $D_3 0$ is a pixel diagonal to the pixel D, the step (a) comprises the sub-steps of:

(a1) comparing a difference between the value[0] and the Average with the quantization factor (QP) of H.263, and designating the pixel A as the corner outlier candidate pixel if the difference is greater than the QP;

(a2) performing the step (a1) on the value[1], value [2] and value[3] to designate a corresponding pixel as a corner outlier candidate pixel; and (a3) designating the candidate pixel as a corner outlier pixel if the corner outlier candidate pixel is only one, and designating the candidate pixel having the greatest difference from $(A_3+B_3+C_3+D_3+2)/4$ as a corner outlier pixel if there are two or more corner outlier candidate pixels, and wherein the step (b) is performed by compensating for the pixel A by $(4A+B+C+2D+4)/8$, the pixel $A_1$ by $(A'+3A_1+2)/4$, the pixel $A_2$ by $(A'+3A_2+2)/4$, if the corner outlier pixel is A and the difference between the pixels A and $A_3$ is less than 3QP/2; compensating for the pixel B by $(4B+C+D+2A+4)/8$, the pixel $B_1$ by $(B'+3B_1+2)/4$, the pixel $B_2$ by $(B'+BA_2+2)/4$, if the corner outlier pixel is B and the difference between the pixels B and $B_3$ is less than 3QP/2; compensating for the pixel C by $(4C+D+A+2B+4)/8$, the pixel $C_1$ as $C_1'$ by $(C_1+3C_1+2)/4$, the pixel $C_2$ by $(C'+3C_2+2)/4$, if the corner outlier pixel is C and the difference between the pixels C and $C_3$ is less than 3QP/2; and compensating for the pixel D by $(4D+A+B+2C+4)/8$, the pixel $D_1$ as $D_1'$ by $(D'+3D_1+2)/4$, the pixel $D_2$ by $(D'+3D_2+2)/4$, if the corner outlier pixel is D and the difference between the pixels D and $D_3$ is less than 3QP/2.

* * * * *